United States Patent [19]
Aizawa

[11] Patent Number: 4,513,362
[45] Date of Patent: Apr. 23, 1985

[54] VOLTAGE INVERTER DEVICE
[75] Inventor: Yukio Aizawa, Mie, Japan
[73] Assignee: Tokyo Shibaura Denki Kabushiki Kaisha, Kawasaki, Japan
[21] Appl. No.: 488,811
[22] Filed: Apr. 26, 1983
[30] Foreign Application Priority Data
May 6, 1982 [JP] Japan .................... 57-75835
[51] Int. Cl.³ .......................... H02M 7/217
[52] U.S. Cl. ...................... 363/41; 363/98; 363/132
[58] Field of Search .............. 363/41, 42, 96, 97, 363/131, 132, 136, 138, 160; 318/810, 811
[56] References Cited
U.S. PATENT DOCUMENTS
3,538,420 11/1970 Klein ............................ 363/42
4,173,722 11/1979 Detering ......................... 363/96
4,290,108 9/1981 Woehrle et al. .................. 363/41
4,325,112 4/1982 Otusku ........................... 363/42
4,370,702 1/1983 Shuey et al. ..................... 363/42

Primary Examiner—Peter S. Wong
Assistant Examiner—Judson H. Jones
Attorney, Agent, or Firm—Oblon, Fisher, Spivak, McClelland & Maier

[57] ABSTRACT

A voltage inverter device has a ROM which stores digital values in advance. The digital value is proportional to a voltage-time integration value of an AC output voltage waveform which corresponds to each of a plurality of basic electrical angle intervals. The digital values stored in the ROM are sequentially read out to be compared with time data supplied by a time counter. Comparison results correspond to specific electrical angles of the AC output voltage waveform. The results are combined by a logical circuit so as to obtain a control signal for generating an AC output voltage of desired waveform.

9 Claims, 55 Drawing Figures (A) BASIC SIGNALS (B) POSITIVE SWITCH TRIGGER SIGNAL (C) NEGATIVE SWITCH TRIGGER SIGNAL (D) OUTPUT SIGNAL (A) WAVEFORM AT A RATIO OF HIGH VOLTAGE ($V_H$) TO HIGH FREQUENCY ($f_H$)

(B) WAVEFORM AT A RATIO OF LOW VOLTAGE ($V_L$) TO LOW FREQUENCY ($f_L$)

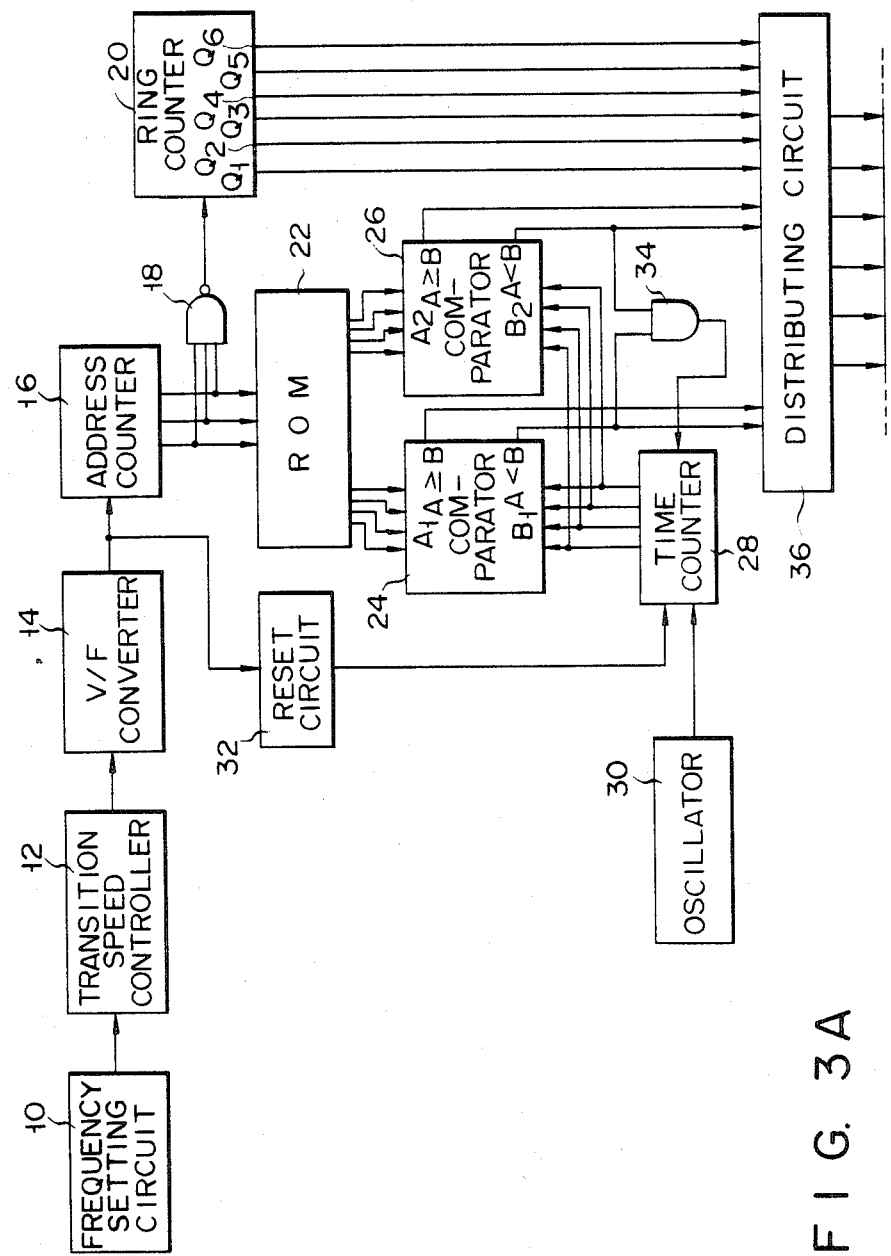
F I G. 3A

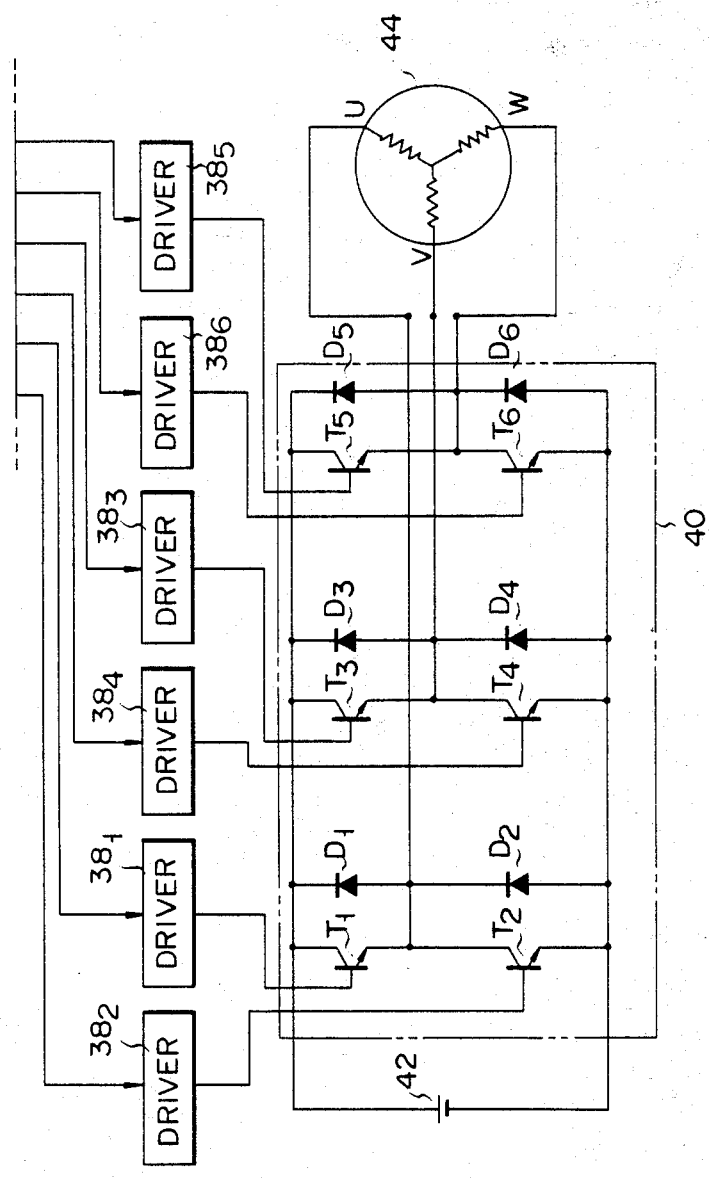
F I G. 3B

F I G. 13
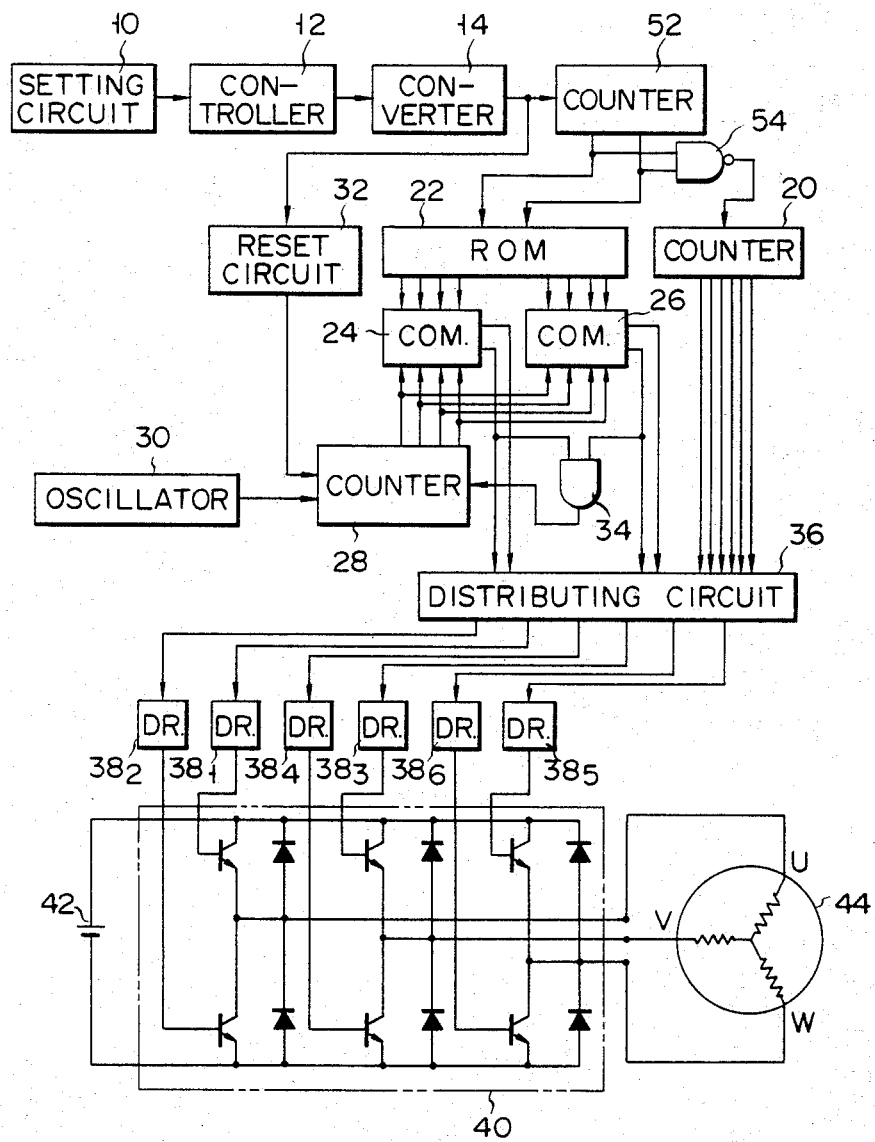

VOLTAGE INVERTER DEVICE

BACKGROUND OF THE INVENTION

The present invention relates to an inverter device and, more particularly, to a voltage inverter device which has a simple, highly reliable and high-performance control circuit.

Generally, except for special cases, a voltage inverter preferably has an output voltage of a sinusoidal waveform. Various types of waveform converting means have been proposed in order to obtain a sinusoidal output from a DC voltage source. For example, an inverter is known which generates a sinusoidal pulsewidth modulated signal.

FIG. 1A shows a basic signal for obtaining a timing signal for turning on/off a main circuit switch of an inverter of this type. A reference voltage signal $S_1$ of a sinusoidal waveform is compared with a carrier signal T of a triangular waveform to obtain timing or trigger signals (FIG. 1B and 1C) for triggering positive and negative switches, respectively, of a main circuit switch. The ON/OFF state of the main circuit switch is controlled by these signals, so that a pulsewidth modulated output voltage signal which is shown in FIG. 1D is obtained. The modulated voltage signal thus obtained may have a sinusoidal waveform indicated by a dotted line in FIG. 1D. In this manner, the sinusoidal voltage signal $S_2$ corresponding to the reference voltage signal $S_1$ is obtained.

In conventional sinusoidal modulation methods, a sinusoidal voltage signal is generally compared with a triangular carrier signal. However, this requires a multiplier to obtain a sinusoidal reference voltage signal by multiplying a unit sinusoidal wave by a value corresponding to a predetermined voltage. Furthermore, when the frequency of the triangular carrier wave is kept constant, a ratio of the carrier frequency to the output frequency decreases with an increase in the output frequency. As a result, a beat frequency significantly affects the output frequency. In order to suppress the beat frequency and to obtain a symmetrical output waveform, it is necessary to synchronize the output frequency and the carrier frequency. In order to obtain a symmetrical output waveform over a wide frequency range, it is still necessary to synchronize the output frequency and the carrier frequency. With a conventional inverter adopting such a conventional sinusoidal modulation method as described above, the configuration of the control circuit is complicated. In addition, in order to obtain the timing signal which turns the main circuit switch on/off, the conventional inverter requires an analog circuit comprising an operational amplifier circuit and the like for comparing the triangular wave and the sinusoidal wave. The conventional inverter is therefore likely to be adversely affected by a noise signal and so on. As a result, it has been difficult to manufacture an inverter having high performance and high reliability.

SUMMARY OF THE INVENTION

It is, therefore, an object of the present invention to provide a voltage inverter device of improved performance and reliability which uses a control circuit of simple configuration.

According to the present invention, a period of an AC output voltage waveform is equally divided by a first predetermined number into a plurality of first electrical angle intervals. Each of the first electrical intervals is also equally divided by a second predetermined number into a plurality of second electrical angle intervals. A digital value which is proportional to an integrated value over time of the AC output voltage waveform for each second electrical angle interval of a first electrical angle interval is determined in advance. The digital value is stored in memory means in correspondence with each of the second electrical angle intervals in advance.

A control signal corresponding to the AC output voltage waveform of each of the first electrical angle intervals is obtained by combining the digital values stored in the memory means. More specifically, the digital values stored are sequentially read out from the memory means by address counter means to be compared with timing data supplied from a time counter. An output from the address counter means is further counted by another counter means. Every time the count reaches a predetermined value, a signal corresponding to each of the first electrical angle intervals is sequentially produced. The comparison output results are combined by a logical circuit for each period of the AC output voltage waveform on the basis of the signals corresponding to the first electrical angle intervals so as to obtain signals for turning the main circuit switch on/off.

In the present invention, basic digital signals are combined according to predetermined rules so as to turn the main circuit switch on/off. This improves the performance and reliability of the inverter device. Furthermore, the configuration of the inverter device of the present invention may be simplified since a digital control circuit is used.

BRIEF DESCRIPTION OF THE DRAWINGS

By way of example and to make the description clearer, reference is made to the accompanying drawings in which:

FIGS. 3A and 3B are schematic block diagrams showing a three-phase voltage inverter according to a first embodiment of the present invention;

FIG. 13 is a schematic block diagram showing the configuration of a three-phase voltage inverter according to a third embodiment of the present invention.

DETAILED DESCRIPTION OF THE PREFERRED EMBODIMENTS

A voltage inverter device according to a first embodiment of the present invention will be described below with reference to the accompanying drawings. First, control of voltage-time integration and comparison which is the basic principle of operation of the present invention will be described.

An instantaneous value $e_0$ an AC voltage having a sinusoidal waveform is given by;

$$e_0 = \sqrt{2}\ V_0 \sin 2\pi f_0 t \tag{1}$$

where:
  $V_0$ is the effective value of the AC voltage
  $f_0$ is the frequency
A voltage-time integration value S of an electrical angle $\theta_2$ (where $t = \theta/2\pi f_0$) obtained from an electrical angle $\theta_1$ ($t=0$) of $e_0$ is given by:

$$S = \int_0^\theta (\sqrt{2}\ V_0 \sin 2\pi f_0 t) dt \tag{2}$$

$$= (\sqrt{2}\ V_0/2\pi f_0)(1 - \cos\theta)$$

If $V_0$ and $f_0$ have a constant ratio K, that is, a voltage to frequency ratio (to be referred to as a V/f ratio hereinafter) of an AC voltage of sinusoidal waveform is kept constant, the voltage-time integration value S of it is given by;

$$S = (\sqrt{2}\ K/2\pi)(1 - \cos\theta) \tag{3}$$

As may be apparent from equation (3), the voltage-time integration value S can be obtained only as a function of the electric angle $\theta$ and independently of either voltage or frequency.

Figure 1:
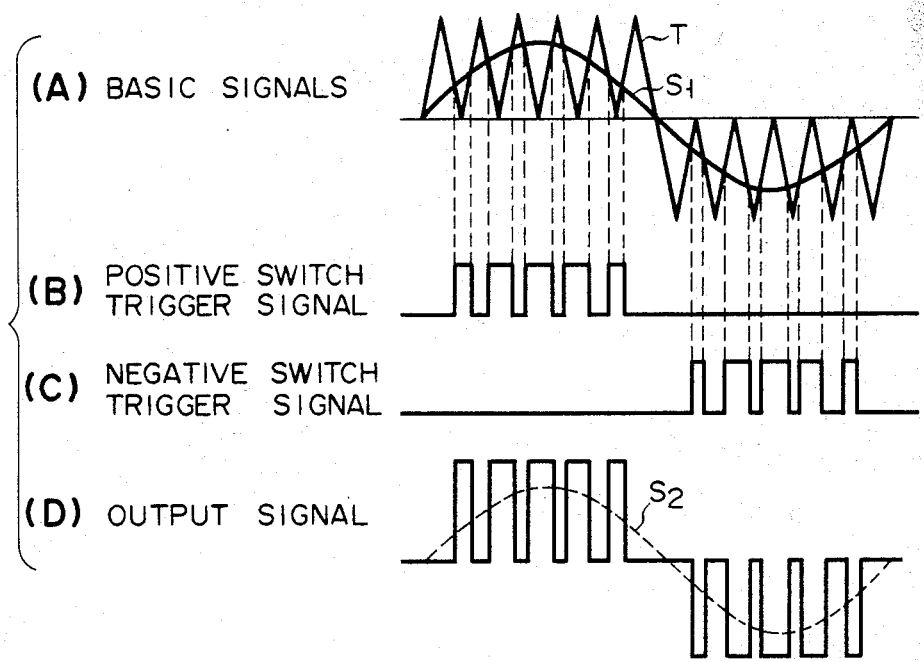
FIGS. 1A through 1D are timing charts for explaining the operation of a conventional voltage inverter device.
Figure 2:
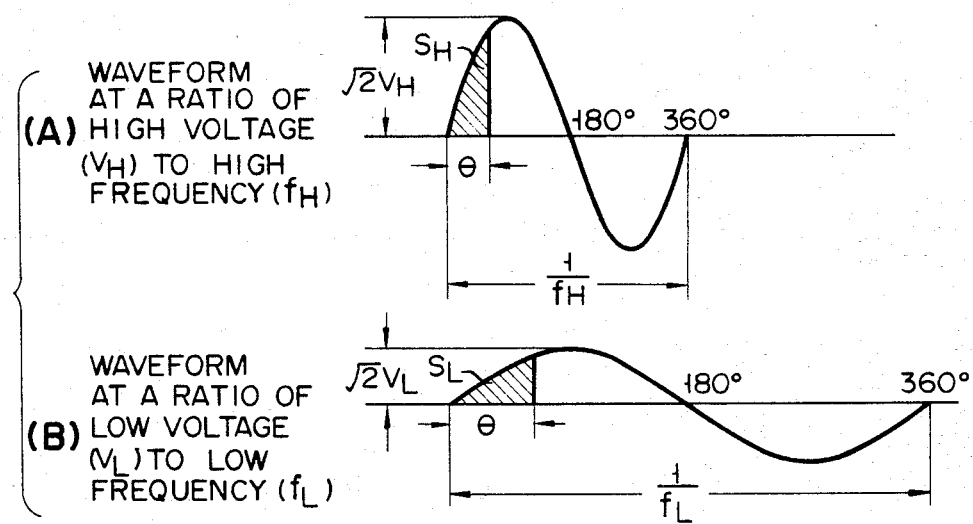
FIGS. 2A and 2B are views for explaining control of voltage-time integration and comparison.

FIG. 2A shows one cycle of a waveform having a high voltage $V_H$ and a high frequency $f_H$ at a constant V/f ratio. FIG. 2B shows one cycle of a waveform having a low voltage $V_L$ and a low frequency $f_L$ at the same constant V/f ratio. It is seen from equation (3) that hatched areas $S_H$ and $S_L$ in FIGS. 2A and 2B, which correspond to the voltage-time integration values over a given electrical angle $\theta$, are equal to each other.

As a result, a desired AC output voltage having a sinusoidal waveform and a predetermined V/f ratio can be obtained by turning the main circuit switch on/off in accordance with a predetermined voltage-time integration value corresponding to the electrical angle $\theta$ of the desired output waveform.

The following description will be made on the basis of the above principle of operation. FIGS. 3A and 3B are schematic block diagrams of a three-phase voltage inverter according to a first embodiment of the present invention.

Figure 4:
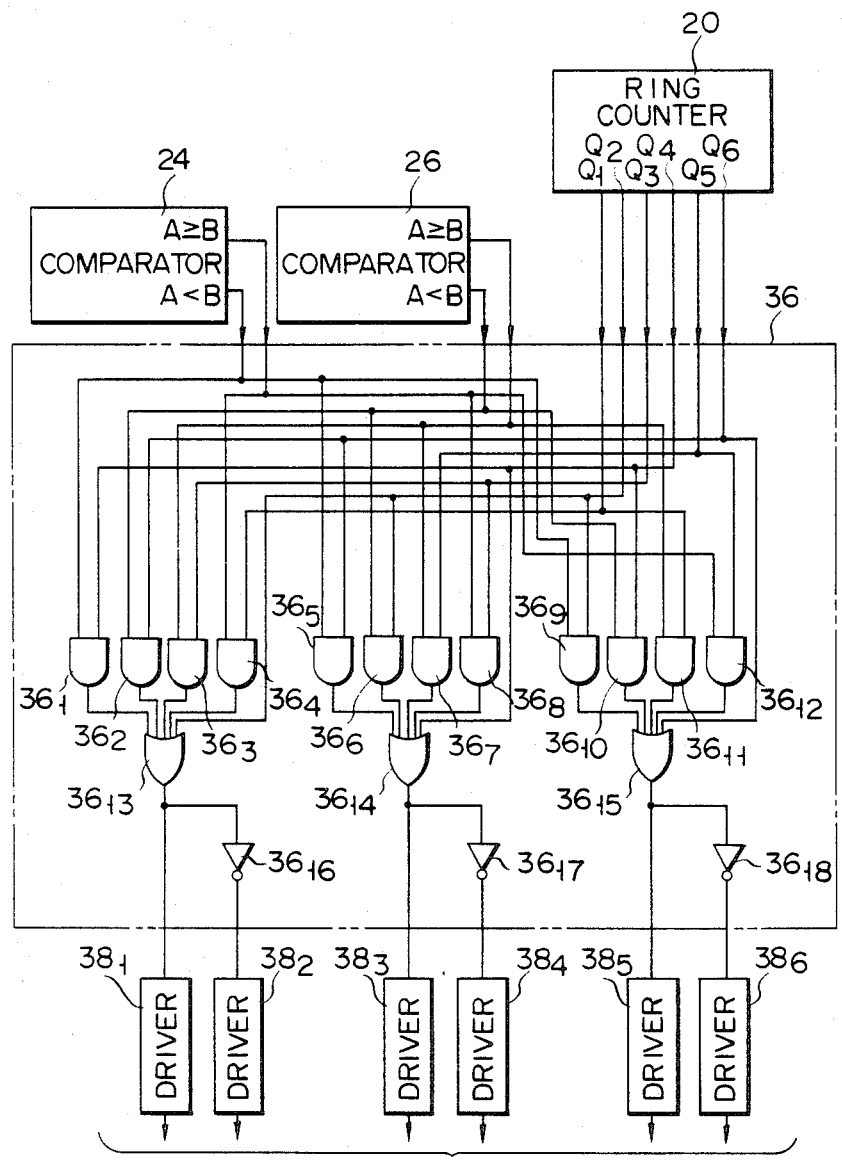
FIG. 4 is a circuit diagram of a distributing circuit shown in FIG. 3A.

A frequency setting circuit 10 sets a desired frequency of the AC output voltage. It produces a DC voltage which has a frequency proportional to the frequency of the output AC voltage. A transition speed controller 12 is connected to the frequency setting circuit 10 and sets timings for increasing and decreasing the frequency of the AC output voltage so that the transition speed of the load may be regulated. More specifically, the output from the transition speed controller 12 is a DC voltage. The level of the DC voltage changes at predetermined timings until it coincides with a level proportional to the preset output voltage from the frequency setting circuit 10. A voltage/frequency converter 14 (to be referred to as a V/F converter hereinafter) is connected to the transition speed controller 12, and produces pulses having a frequency proportional to the DC output voltage therefrom. The frequency of the pulses from the V/F converter 14 becomes proportional to that set by the frequency setting circuit 10. An address counter 16 is connected to the V/F converter 14 and counts output pulses therefrom. The address counter 16 comprises a binary counter. A NAND gate 18 is connected to the address counter 16 and determines boundaries between a given electrical angle 60° and the next electrical angle 60° of the AC output voltage. Every time the address counter 16 counts 8 pulses, the output signal from the NAND gate 18 rises from low level to high level at the leading edge of the eighth pulse. A 6-scale of ring counter 20 is connected to the NAND gate 18 and counts positive-going pulses therefrom. A read-only memory (to be referred to as a ROM hereinafter) 22 is connected to the address counter 16. An address in the ROM 22 is assigned in correspondence with the count of the address counter 16 so that data at that address can be read out. A comparator 24 is connected to upper-4 bit output terminals of the ROM 22 to receive a comparison input $A_1$ therefrom. Another comparator 26 is connected to lower-4 bit output terminals of the ROM 22 to receive a comparison output $A_2$ therefrom. A time counter 28 is connected to an oscillator 30 so as to count a pulse of a predetermined frequency produced thereby for counting time. The counter 28 comprises a binary counter. A one-shot circuit or a reset counter 32 is connected to the V/F converter 14 so as to generate a reset signal in synchronism with the positive-going pulse signal which is supplied to the address counter 16. The reset signal clears the time counter 28 so that the time counter 28 will be ready to start counting a pulse from the oscillator 30. In other words, the time counter 28 performs counting for every address in the ROM 22. The time counter 28 is connected to the comparators 24 and 26 for supplying comparison outputs $B_1$ and $B_2$, respectively, thereto. The comparator 24 and 26 compare the comparison inputs $A_1$ and $A_2$, with $B_1$ and $B_2$, respectively. If the output value of the ROM 22 is greater than or equal to the count of the time counter 28, that is, whether the value of the comparison input A is greater than or equal to the value of the comparison input B, the comparator 24 and 26 respectively produce signals of high level through a comparison output terminal ($A \geq B$) thereof, and signals of low level through another comparison output terminal ($A < B$) thereof. On the other hand, if the output value of the ROM 22 is smaller than the count of the time counter 28, that is, if the value of the comparison input A is smaller than the value of the comparison input B, the comparator 24 and 26 produces signals of low level through the comparison output terminal ($A \geq B$) thereof and of high level through the comparison output terminal ($A < B$) thereof, respectively. An AND gate 34 is connected to the comparators 24 and 26 so as to detect signals of high level from their comparison output terminals (A<B). In response to a detection signal from the AND gate 34, the time counter 28 stops counting up pulses. This prevents the time counter 28 from restarting counting from 0. A distributing circuit 36 is connected to the 6-scale of ring counter 20 and the comparators 24 and 26. The 6-scale of ring counter 20 supplies an output signal which is shifted every 60° of electrical angle to the distributing circuit 36. The comparators 24 and 26 supply comparison output signals to the distributing circuit 36. The distributing circuit 36 combines the input signals to generate a distributing signal. FIG. 4 is a circuit diagram of the distributing circuit 36. Referring to FIG. 4, the distributing circuit 36 includes: AND gates $36_1$ to $36_{12}$ for receiving outputs $Q_1$ to $Q_6$ from the 6-scale of ring counter 20 and comparison output signals from the comparators 24 and 26; OR gates $36_{13}$ to $36_{15}$ for receiving outputs from the AND gates $36_1$ to $36_{12}$ and outputs $Q_2$, $Q_4$ and $Q_6$ from the 6-scale of ring counter 20 and for producing distributing signals; and inverter gates $36_{16}$ to $36_{18}$ for inverting the distributing signals. Drivers $38_1$ to $38_6$ are connected to the distributing circuit 36 so as to switch transistors $T_1$ to $T_6$ connected thereto under a predetermined condition. The transistors $T_1$ to $T_6$ are bridge-connected, thereby constituting a main circuit switch 40, as shown in FIG. 3B. Diodes $D_1$ to $D_6$ are connected in parallel between the collectors and emitters of the transistors $T_1$ to $T_6$, respectively. A DC voltage source 42 is connected to the main circuit switch 40 in order to supply a DC voltage $E_d$. The main circuit switch 40 pulse-width modulates the DC voltage $E_d$ and supplies a three-phase DC voltage of sinusoidal waveform to an induction motor 44.

The transistors $T_1$ to $T_6$ are turned on/off such that they have relationships with each other as shown in TABLE 1.

TABLE 1

| Transistors | Intervals | | | | | |
|---|---|---|---|---|---|---|
| | A | B | C | D | E | F |
| $T_1$ | $S_1(\theta)$ | ON | $S_2(\theta)$ | $\overline{S_1(\theta)}$ | OFF | $\overline{S_2(\theta)}$ |
| $T_2$ | $\overline{S_1(\theta)}$ | OFF | $\overline{S_2(\theta)}$ | $S_1(\theta)$ | ON | $S_2(\theta)$ |
| $T_3$ | OFF | $\overline{S_2(\theta)}$ | $S_1(\theta)$ | ON | $S_2(\theta)$ | $\overline{S_1(\theta)}$ |
| $T_4$ | ON | $S_2(\theta)$ | $\overline{S_1(\theta)}$ | OFF | $\overline{S_2(\theta)}$ | $S_1(\theta)$ |
| $T_5$ | $S_2(\theta)$ | $\overline{S_1(\theta)}$ | OFF | $\overline{S_2(\theta)}$ | $S_1(\theta)$ | ON |
| $T_6$ | $\overline{S_2(\theta)}$ | $S_1(\theta)$ | ON | $S_2(\theta)$ | $\overline{S_1(\theta)}$ | OFF |

Figure 5:
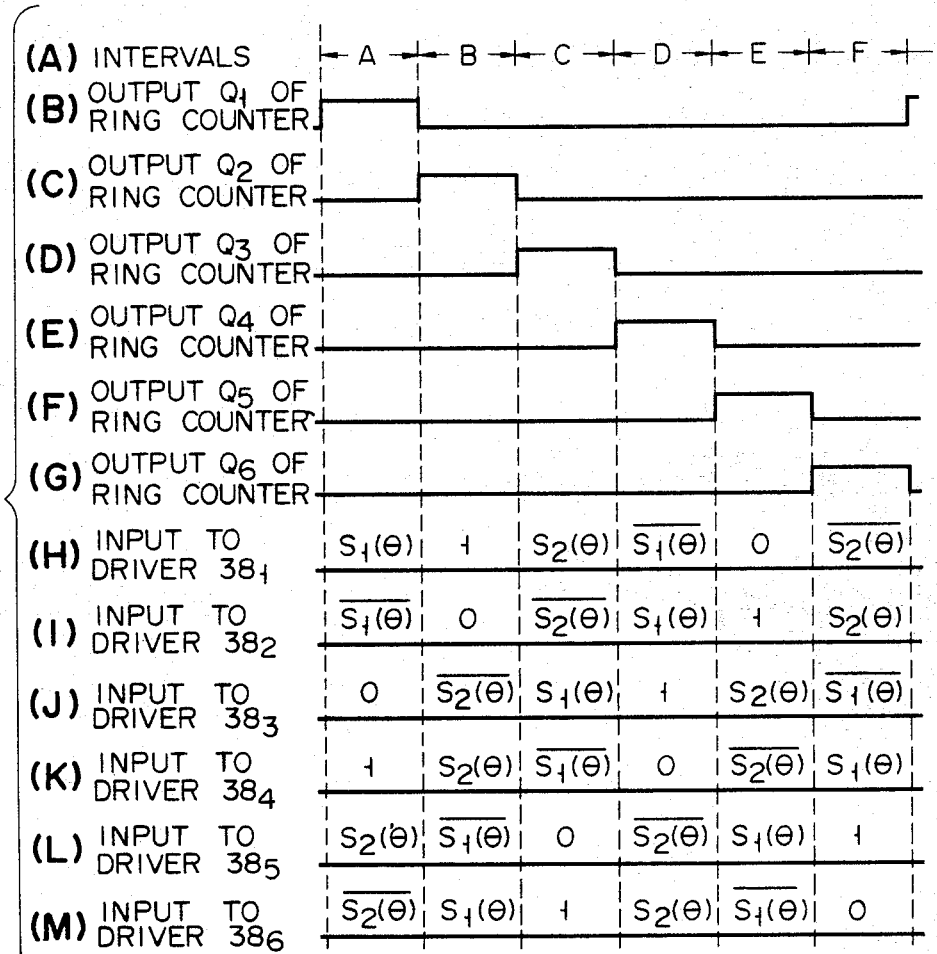
FIGS. 5A through 5M are timing charts for explaining the mode of operation of a b-scale of ring counter and drivers.

FIG. 5A shows intervals A to F shown in TABLE 1. FIGS. 5B through 5G are timing charts of the output $Q_1$ to $Q_6$ from the senary ring counter 20, respectively, for the intervals A to F. FIGS. 5H through 5M show signals supplied to the drivers $38_1$ to $38_6$ according to the timings shown in FIGS. 5B through 5G. These signals correspond to the contents of TABLE 1.

Figure 6:
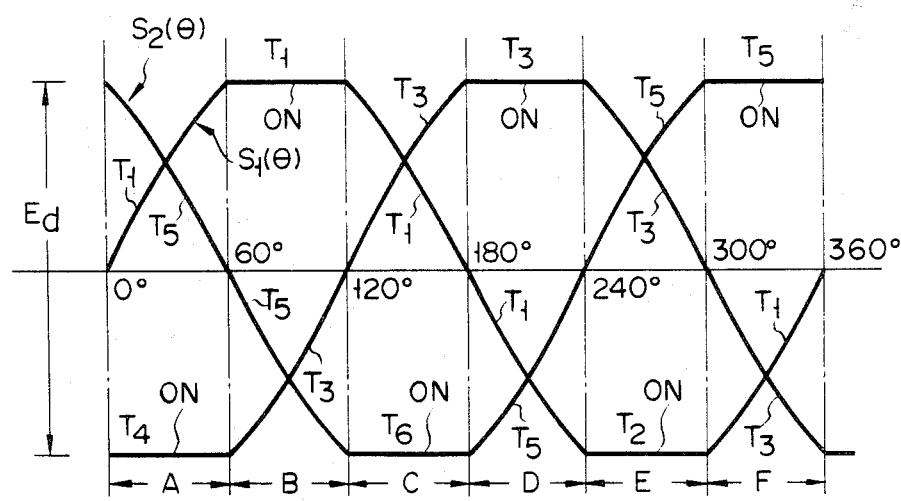
FIG. 6 is a graph corresponding to a part of TABLE 1.

FIG. 6 shows a graph corresponding to a part of the contents of TABLE 1. In TABLE 1, symbols A to F represent control intervals obtained by dividing the output period by every electrical angle of 60°. Symbols "ON" and "OFF" represent that a transistor is set at the ON state and the OFF state, respectively. A voltage-time integration value $S_1(\theta)$ is given by:

$$S_1(\theta) = \sqrt{2}\ K/2\pi \int_0^\theta \sin(\theta + 30°)d\theta$$

and $\overline{S_1(\theta)}$ indicates an inverted value of $S_1(\theta)$. Another voltage-time integration value $S_2(\theta)$ is given by:

$$S_2(\theta) = \sqrt{2}\ K/2\pi \int_0^\theta \sin(\theta + 90°)d\theta$$

$$= \sqrt{2}\ K/2\pi \int_0^\theta \cos\theta d\theta$$

and $\overline{S_2(\theta)}$ indicates an inverted value of $S_2(\theta)$.

The on/off control of the transistors $T_1$ to $T_6$ will now be described with reference to interval A. Assume that the transistor $T_4$ is ON and is connected to a negative terminal of the DC power source 42. The transistor $T_3$ is OFF. The transistor $T_1$ is turned on/off such that the output therefrom corresponds to a voltage-time integration value $S_1(\theta)$ with respect to an electrical angle $\theta$. This sets a line-to-line voltage $V_{U-V}$ between U and V phases shown in FIG. 3B at $\sqrt{2}f_0K\sin(\theta+30°)$. The transistor $T_2$ is turned on/off such that the output thereof corresponds to $\overline{S_1(\theta)}$. The transistor $T_5$ is turned on/off such that the output thereof corresponds to a voltage-time integration value $S_2(\theta)$ with respect to the electrical angle $\theta$. These on/off control operations keep a line-to-line voltage $V_{W-V}$ between W and V phases at $\sqrt{2}f_0K\cos\theta$. As a result, a line-to-line voltage $V_{V-W}$ between V and W phases is kept at $\sqrt{2}f_0K\cos\theta$. The transistor $T_6$ is turned on/off such that the output thereof corresponds to $\overline{S_2(\theta)}$. As a result, a line-to-line voltage $V_{W-U}$ between W and U phases is kept at:

$$V_{W-U} = -(V_{U-V} + V_{V-W}) \quad (4)$$

$$= -\{\sqrt{2}\ f_0K\sin(\theta + 30°) - \sqrt{2}\ f_0K\cos\theta\}$$

$$= -\sqrt{2}\ f_0K\sin(\theta - 30°).$$

A similar explanation can be made for other intervals B to F. The line-to-line voltages for these intervals A to F are shown in TABLE 2.

TABLE 2

| Intervals | Line-to-line voltage | | |
|---|---|---|---|
| | $V_{U-V}$ | $V_{V-W}$ | $V_{W-U}$ |
| A | $\sqrt{2}\ f_0K\sin(\theta + 30°)$ | $-\sqrt{2}\ f_0K\cos\theta$ | $-\sqrt{2}\ f_0K\sin(\theta - 30°)$ |
| B | $\sqrt{2}\ f_0K\cos\theta$ | $\sqrt{2}\ f_0K\sin(\theta - 30°)$ | $-\sqrt{2}\ f_0K\sin(\theta + 30°)$ |
| C | $-\sqrt{2}\ f_0K\sin(\theta - 30°)$ | $\sqrt{2}\ f_0K\sin(\theta + 30°)$ | $-\sqrt{2}\ f_0K\cos\theta$ |

TABLE 2-continued

| Intervals | Line-to-line voltage | | |
|---|---|---|---|
| | $V_{U-V}$ | $V_{V-W}$ | $V_{W-U}$ |
| D | $-\sqrt{2}\,f_0K\sin(\theta + 30°)$ | $\sqrt{2}\,f_0K\cos\theta$ | $\sqrt{2}\,f_0K\sin(\theta - 30°)$ |
| E | $-\sqrt{2}\,f_0K\cos\theta$ | $-\sqrt{2}\,f_0K\sin(\theta - 30°)$ | $\sqrt{2}\,f_0K\sin(\theta + 30°)$ |
| F | $\sqrt{2}\,f_0K\sin(\theta - 30°)$ | $-\sqrt{2}\,f_0K\sin(\theta + 30°)$ | $\sqrt{2}\,f_0K\cos\theta$ |

Figure 7:
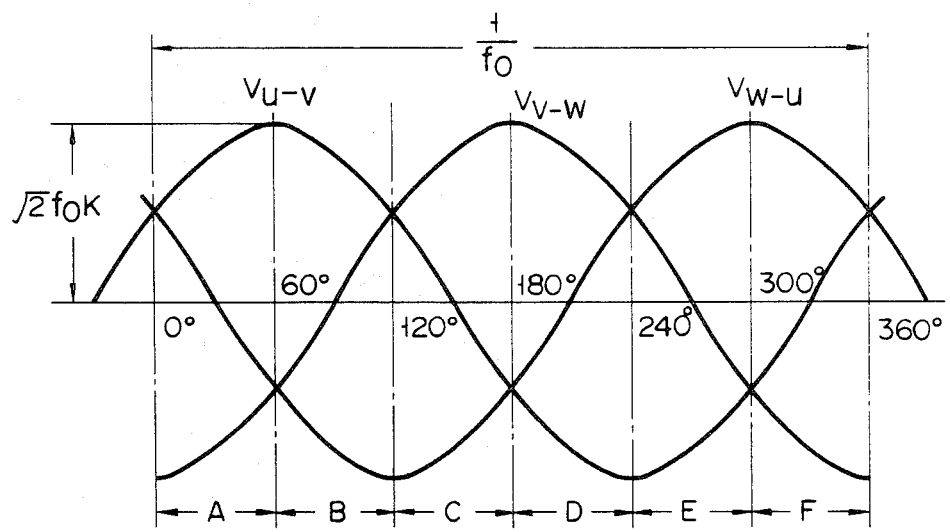
FIG. 7 is a graph corresponding to TABLE 2.

It is seen from a graph in FIG. 7 corresponding to TABLE 2 that an AC voltage of sinusoidal waveform which is proportional to the frequency can be obtained at an inverter output terminal.

Figure 8A:
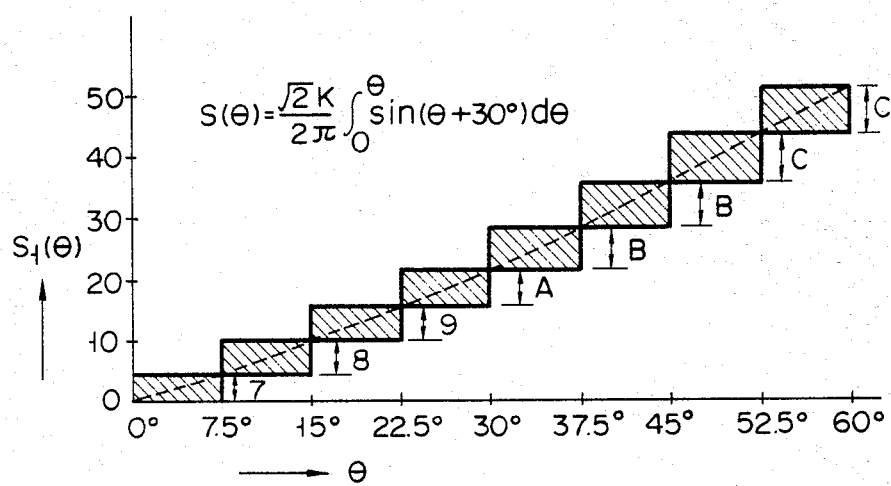
FIGS. 8A and 8B are views for explaining data stored in a ROM shown in FIG. 3A.
Figure 8B:
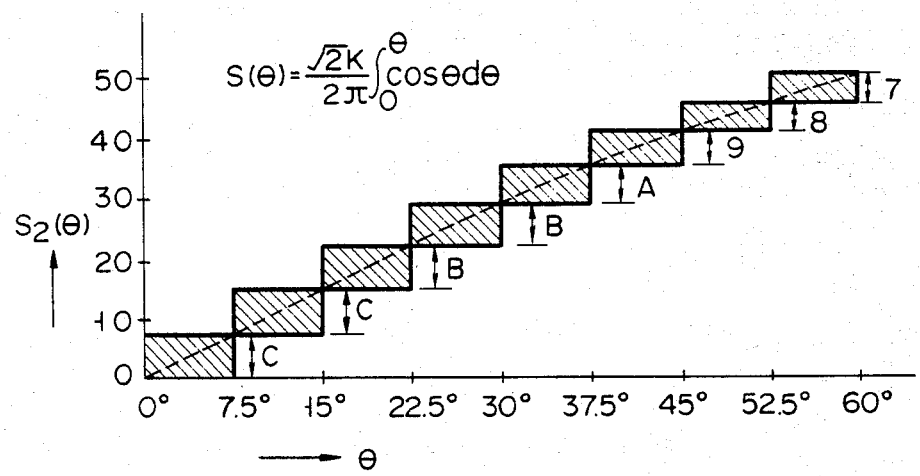

The data of $S_1(\theta)$ and $S_2(\theta)$ are stored in the ROM 22, which comprises at least 8 bits. The following explanation is made under an assumption that an 8-bit ROM 22 is used. Output data of the ROM 22 is divided into upper 4 bits and lower 4 bits. The upper 4 bits store data relating to $S_1(\theta)$ and the lower 4 bits store data relating to $S_2(\theta)$. $S_1(\theta)$ or $S_2(\theta)$ are not directly stored in the ROM 22. A value which is proportional to a voltage-time integration value for each of the divided intervals is obtained by equally dividing the electrical angle of 60° by a predetermined number (eight in the first embodiment of the present invention) as shown in FIG. 8A and 8B. The increase in $S_1(\theta)$ and $S_2(\theta)$ corresponding to each of the eight divided intervals is indicated by hatched areas, respectively. A value which is proportional to the increase in $S_1(\theta)$ or $S_2(\theta)$ is used as data. $S_1(\theta)$ or $S_2(\theta)$ may alternatively be stored as data. However, in that case, the memory capacity of the ROM 22 must be increased and the signal processing becomes complicated. Therefore, it is preferable to use the proportional value as the data. TABLE 3 shows data obtained in a case where the period of the electrical angle of 60° is equally divided into eight intervals. Digits of hexadecimal data are stored in addresses 0 to 7, respectively, of the ROM 22.

TABLE 3

| Electrical angle $\theta$ | Address | Data stored in ROM | |
|---|---|---|---|
| | | upper-4 bits | lower-4 bits |
| $0 \leq \theta < 7.5$ | 0 | 7 | C |
| $7.5 \leq \theta < 15$ | 1 | 8 | C |
| $15 \leq \theta < 22.5$ | 2 | 9 | B |
| $22.5 \leq \theta < 30$ | 3 | A | B |
| $30.0 \leq \theta < 37.5$ | 4 | B | A |
| $37.5 \leq \theta < 45$ | 5 | B | 9 |
| $45 \leq \theta < 52.5$ | 6 | C | 8 |
| $52.5 \leq \theta < 60$ | 7 | C | 7 |

Figure 9:
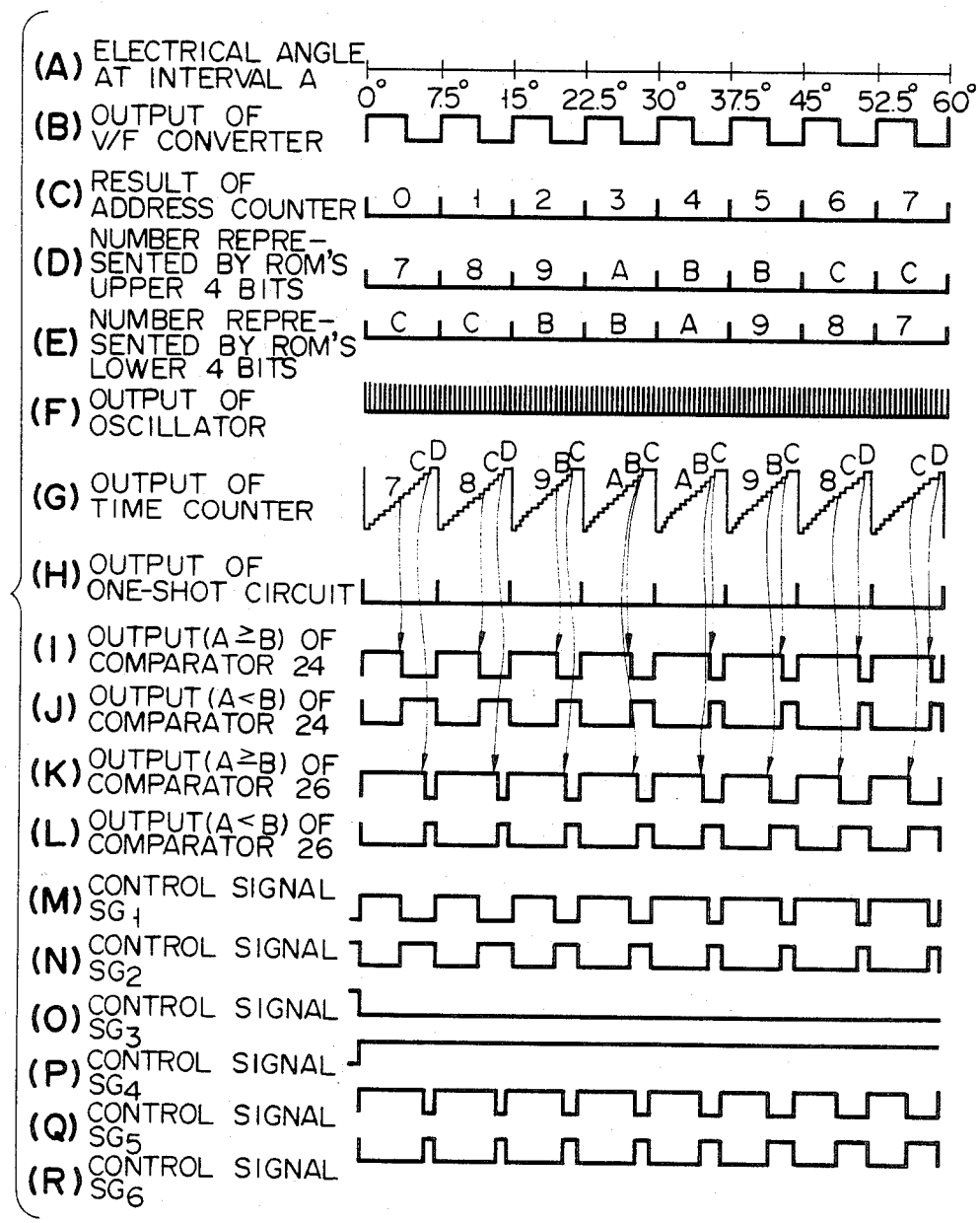
FIGS. 9A through 9R, FIGS. 10A through 10F, and FIGS. 11A through 11C are timing charts for explaining the operation of the three-phase voltage inverter according to the first embodiment of the present invention.
Figure 11:
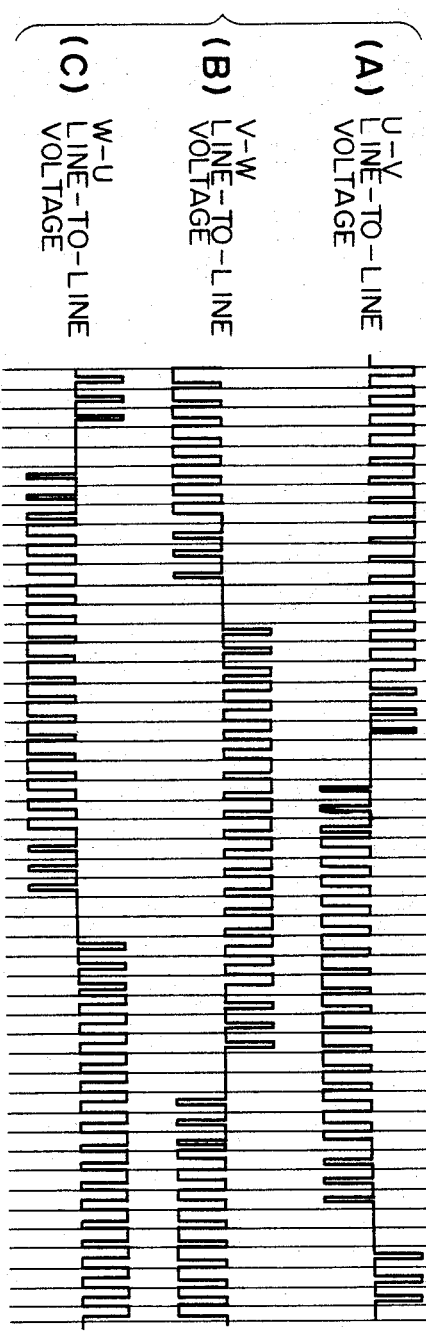
Figure 10:
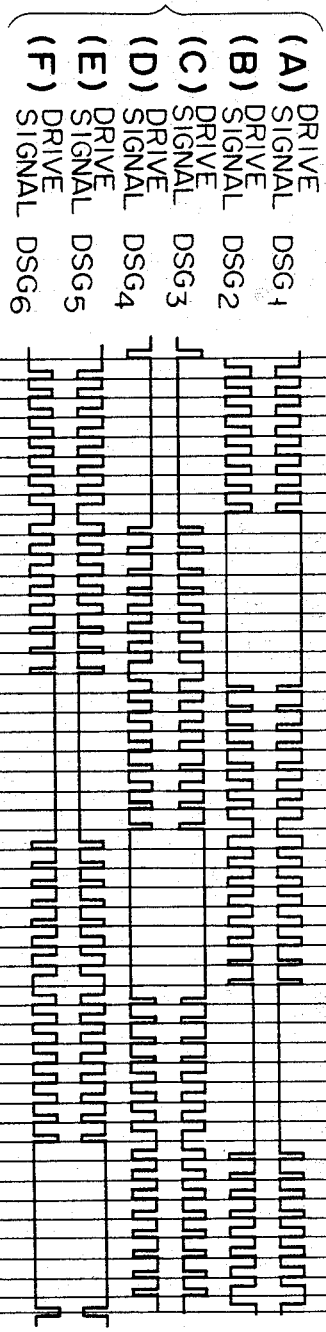

The mode of operation of the three-phase voltage inverter shown in FIGS. 3A and 3B, according to the first embodiment of the present invention, will now be described with reference to FIGS. 9A through 9R. Timing charts shown in FIGS. 9A through 9R relate to the interval A. FIG. 9A shows a case wherein the electrical angle of 60° of the interval A is divided into eight intervals. When the frequency setting circuit 10 sets the frequency of the output voltage, an output signal therefrom is supplied to the V/F inverter 14 through the transition speed controller 12. The V/F inverter 14 generates a pulse shown in FIG. 9B. The address counter 16 counts the pulse and produces the count shown in FIG. 9C. The count designates an address of the ROM 22. Then, the data (FIGS. 9D and 9E) at the designated address of the ROM 22 is transferred to the comparators 24 and 26, respectively. Meanwhile, a clock pulse shown in FIG. 9F is generated by the oscillator 30. The clock pulse is counted by the time counter 28 which then produces the count shown in FIG. 9G. The time counter 28 stops counting in response to the output signal from the AND gate 34 when the count becomes greater than a greater value between upper-4 bits and lower-4 bits of the ROM 22. The reset circuit 32 produces a pulse synchronous with the positive-going signal (FIG. 9H) from the V/F converter 14 and resets the time counter 28. The comparators 24 and 26 compares data from the ROM 22 and the time counter 28 to produce pulse signals shown in FIGS. 9I through 9L. The distributing circuit 36 transfers control signals $SG_1$ to $SG_6$ to the drivers $38_1$ to $38_6$ in accordance with the comparison signals from the comparators 24 and 26 and shift signals from the 6-scale of ring counter 20, respectively. The control signals $SG_1$ to $SG_6$ are amplified by the drivers $38_1$ to $38_6$ and are supplied to the corresponding transistors $T_1$ to $T_6$. FIGS. 10A through 10F show drive signals $DSG_1$ to $DSG_6$ produced by the drivers $38_1$ to $38_6$ with respect to electrical angles from 0° to 360°. As a result, line-to-line output voltage waveforms as shown in FIGS. 11A through 11C are obtained.

Figure 12:
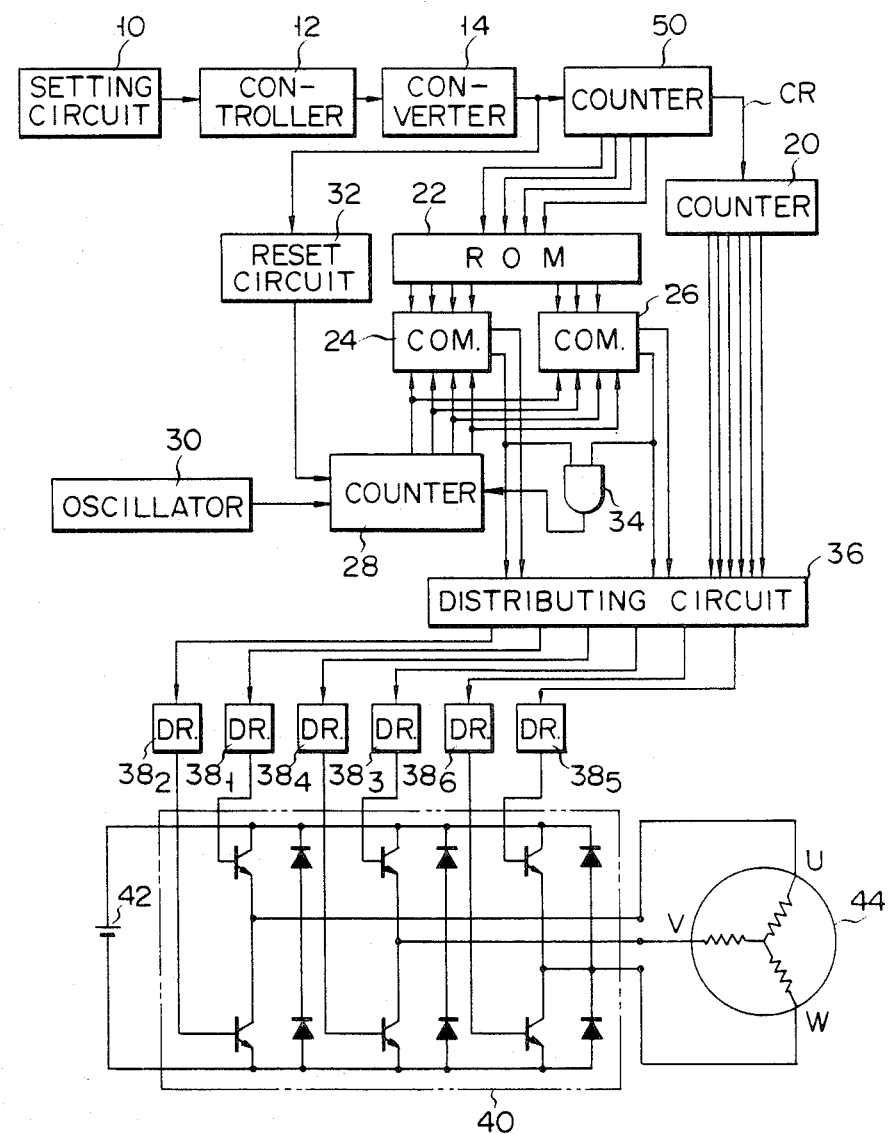
FIG. 12 is a schematic block diagram showing the configuration of a three-phase voltage inverter according to a second embodiment of the present invention.

FIG. 12 is a schematic block diagram showing the configuration of a three-phase inverter according to a second embodiment of the present invention. The same reference numerals are used to indicate the same parts as in FIGS. 3A and 3B. According to the second embodiment, the electrical angle of 60° is equally divided into sixteen intervals and the content of a 6-scale of ring counter 20 is shifted in response to a carry signal CR from an address counter 50.

FIG. 13 is a schematic block diagram showing a three-phase voltage inverter according to a third embodiment of the present invention. The same reference numerals are used to indicate the same parts as in FIGS. 3A and 3B. According to the third embodiment, the electrical angle of 60° is equally divided into four intervals. Every time an address counter 52 counts four pulses, a NAND gate 54 detects the count, generates a signal which rises from low level to high level, whereby the content of 6-scale of ring counter 20 is shifted.

It is to be understood that the present invention is not limited to these embodiments. In the first to third embodiments, the electrical angle is equally divided into eight, sixteen or four intervals, respectively. However, the electrical angle can be equally divided into any desired number of intervals. In that case, the address counter must be designed so as to be reset every time it counts pulses corresponding in number to the number of divided intervals. Furthermore, two or more of the above embodiments can be combined so that the number of intervals can be changed when the output frequency reaches a predetermined value.

Various other changes and modifications may be made without departing from the spirit and the scope of the present invention.

What is claimed is:

1. A voltage inverter device for turning a main circuit switch on/off so as to convert a DC input voltage into an AC output voltage, comprising:
    frequency setting means for setting an output frequency of the AC output voltage;
    voltage/frequency converting means, connected to said frequency setting means, for producing pulses the number of which is proportional to the output frequency in response to a voltage signal supplied from said frequency setting means;
    address counter means, connected to said voltage/frequency converting means, for counting the pulses from said voltage/frequency converting means and for producing an address signal;
    electrical angle counter means, connected to said address counter means, for producing an electrical angle signal every time a count of said address counter means reaches a value corresponding to a predetermined electrical angle of the AC output voltage;
    memory means, connected to said address counter means, for reading out data stored therein in advance in response to the address signal;
    oscillating means for generating a clock signal;
    time counter means, connected to said oscillating means, for counting the clock signals so as to count time corresponding to the predetermined electrical angle;
    comparing means, connected to said time counter and said memory means, for comparing data from said memory means with data from said time counter means;
    logical circuit means, connected to said comparing means and said electrical angle counter means, for generating a signal which turns said main circuit switch on/off in accordance with a comparison signal from said comparing means and the electrical angle signal from said electrical angle counter means; and
    count control means, connected to said voltage/frequency converting means and said comparing means, for clearing a content of said time counter means in synchronism with the comparison signal from said comparator means so as to be ready to resume time counting for the next electrical angle, and stopping said time counter means when the count of said time counter means reaches a predetermined count.

2. A device according to claim 1, wherein said memory means stores digital values at consecutive addresses, the digital values being proportional to voltage-time integration values of the AC output voltage for a plurality of second electrical angle intervals of each of a plurality of first electrical angle intervals, said first electrical angle intervals being obtained by equally dividing a period of a waveform of the AC output voltage by a first predetermined number, said second electrical angle intervals being obtained by equally dividing each of said first electrical intervals, and the addresses of said memory means respectively corresponding to said second electrical angle intervals.

3. A device according to claim 1, wherein said count control means stops said time counter when the count of said time counter becomes greater than the data from said memory means.

4. A device according to claim 2, wherein said first electrical angle intervals correspond to electrical angles of 60° obtained by equally dividing the period of the waveform of the AC output voltage.

5. A device according to claim 4, wherein said electrical angle counter means comprises:
    a gate circuit for producing a pulse when the count of said address counter means reaches a value corresponding to each of the electrical angle of 60°; and
    a 6-scale of ring counter, connected to said gate circuit, for generating the electrical angle signal for each of the electrical angles of 60° by counting a signal from said gate circuit.

6. A device according to claim 4, wherein said address counter means counts the pulses from said voltage/frequency converting means and produces a pulse to said electrical angle counter means when the count of said address counter means reaches a value corresponding to each of the electrical angles of 60°.

7. A device according to claim 6, wherein said electrical angle counter means comprises a 6-scale of ring counter which counts the pulse from said address counter means and generates the electrical angle signal for each of the electrical angles of 60°.

8. A device according to claim 1, wherein said memory means comprises a read-only memory.

9. A device according to claim 2, wherein said voltage-time integration values of the AC output voltage waveform are determined by;

$$S_1(\theta) = \sqrt{2}\, K/2\pi \int_0^\theta \sin(\theta + 30°)d\theta$$

and $$S_2(\theta) = \sqrt{2}\, K/2\pi \int_0^\theta \cos d\theta$$

where $\theta$ is the electrical angle as a parameter, V is the AC output voltage, f is a frequency of the A output voltage, and K is a ratio ($K=V/f$) of the output AC voltage V to the frequency f, and pairs of digital values corresponding to said voltage-time integration values are stored at each of the addresses of said memory means.

* * * * *